(12) United States Patent
Adefris

(10) Patent No.: US 6,702,650 B2
(45) Date of Patent: Mar. 9, 2004

(54) POROUS ABRASIVE ARTICLE HAVING CERAMIC ABRASIVE COMPOSITES, METHODS OF MAKING, AND METHODS OF USE

(75) Inventor: Negus B. Adefris, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 218 days.

(21) Appl. No.: 09/833,883

(22) Filed: Apr. 12, 2001

(65) Prior Publication Data

US 2002/0151265 A1 Oct. 17, 2002

Related U.S. Application Data

(60) Provisional application No. 60/202,626, filed on May 9, 2000.

(51) Int. Cl.[7] .................................................. B24B 1/00
(52) U.S. Cl. ........................... 451/41; 451/533; 51/307; 51/309
(58) Field of Search ................................ 451/533, 526, 451/539, 41; 51/296, 307, 309

(56) References Cited

U.S. PATENT DOCUMENTS

| | | | |
|---|---|---|---|
| 3,993,495 A | * | 11/1976 | Galliath et al. .............. 501/80 |
| 4,311,489 A | | 1/1982 | Kressner |
| 4,364,746 A | | 12/1982 | Bitzer et al. |
| 4,494,964 A | * | 1/1985 | Ohlsson et al. .............. 51/296 |
| 4,541,842 A | | 9/1985 | Rostoker |
| 5,039,311 A | | 8/1991 | Bloecher |
| 5,102,429 A | * | 4/1992 | Wald et al. .................. 51/295 |
| 5,152,917 A | | 10/1992 | Pieper et al. |
| 5,219,462 A | | 6/1993 | Bruxvoort et al. |
| 5,738,697 A | | 4/1998 | Fox et al. |
| 5,975,988 A | | 11/1999 | Christianson |
| 6,217,413 B1 | * | 4/2001 | Christianson .............. 451/28 |
| 6,319,108 B1 | * | 11/2001 | Adefris et al. ............. 451/533 |
| 6,354,929 B1 | * | 3/2002 | Adefris et al. ............. 451/527 |

FOREIGN PATENT DOCUMENTS

| | | |
|---|---|---|
| JP | 108463 | 4/1996 |
| WO | WO 99/42250 | 8/1999 |
| WO | WO01/04227 | 1/2001 |

* cited by examiner

Primary Examiner—M. Rachuba
(74) Attorney, Agent, or Firm—Daniel R. Pastirik; Colene H. Blank

(57) ABSTRACT

An abrasive article made from a plurality of abrasive composites bonded to form a three dimensional abrasive article. Each abrasive composite includes a plurality of primary abrasive particles bonded together by a first binder matrix to form a shaped or irregular abrasive composite. Present within the abrasive composite is an intra-composite porosity between and among the primary abrasive particles. Inter-composite porosity is present within the abrasive article between and among the abrasive composites. The abrasive article is used to grind glass and other workpiece surfaces to a mirror finish.

16 Claims, 5 Drawing Sheets

POROUS ABRASIVE ARTICLE HAVING CERAMIC ABRASIVE COMPOSITES, METHODS OF MAKING, AND METHODS OF USE

Priority under 35 U.S.C. §119(e) is claimed to provisional application serial No. 60/202,626, filed on May 9, 2000, and entitled "Porous Abrasive Article Having Ceramic Abrasive Composites, Methods of Making, and Methods of Use". The complete disclosure of application No. 60/202,626 is incorporated by reference herein.

FIELD

The present invention relates to an abrasive article comprising a plurality of abrasive composites or agglomerates, methods of making the abrasive article, and methods of using the abrasive article to abrade workpiece surfaces. More specifically, the abrasive article includes porosity dispersed throughout the abrasive article among the plurality of abrasive composites or agglomerates.

BACKGROUND

Glass articles are found extensively in homes, offices, and factories in the form of lenses, prisms, mirrors, CRT screens, and other items. Many of these glass surfaces are used with optical components which require that the surface be optically clear and have no visible defects and/or imperfections; such a surface finish is often referred to as a mirror finish. If present in or on the surface, defects, imperfections, and even minute scratches may inhibit the optical clarity of the glass article. In some instances, these defects, imperfections, and/or minute scratches may inhibit the ability to accurately see through the glass. Glass surfaces used with optical components, for example, must be essentially free of any defect, imperfection, and/or scratch.

Articles made from other materials, such as metals, plastics, and ceramics, are also found extensively in homes, offices, and factories. Similar to glass articles, these articles often need to have a mirror finish, that is, a surface that is essentially free of any defect, imperfection, and/or scratch. Examples of articles that need a very fine surface finish include magnetic recording items such as hard disk substrates and electronic components such as read-write heads in computers.

Abrasive finishing processes have been widely used to remove imperfections and/or defects such as mold lines, rough surfaces, small point and other small imperfections in glass and other workpieces. The abrasive finishing typically falls within three main processes: grinding, fining, and polishing.

Grinding steps perfect the desired curve or radius and remove any casting defects by rough grinding the glass surface with an abrasive tool. Typically this abrasive tool contains superabrasive particles such as a diamond, tungsten carbide, or cubic boron nitride. However, the abrasive tool in this rough grinding process will impart coarse scratches to the glass or other surface such that resulting surface is neither precise enough nor smooth enough to directly polish to an optically clear state or other desired finish. The objective of the grinding process is to remove large amounts of material quickly and fairly accurately while leaving as fine of a scratch pattern as feasible. These scratches are then typically removed by further steps commonly known as "fining" and "polishing".

Glass fining and polishing is typically done with a loose abrasive slurry which comprises a plurality of abrasive particles dispersed in a liquid medium such as water. Ceramic and many other articles are also polished with a loose abrasive slurry. The most common abrasive particles used for loose slurries are pumice, silicon carbide, aluminum oxide, and the like. The loose abrasive slurry may optionally contain other additives such as dispersants, lubricants, defoamers, and the like. In most instances, the loose abrasive slurry is pumped between the surface that is being finished and a lap pad, such that the loose abrasive slurry is present between the surface and the lap pad. Typically, the workpiece and the lap pad will move relative to each other while maintaining contact. This process typically comprises one or more steps, with each step generating a progressively finer surface finish on the workpiece surface.

What usually is desired is an abrasive article that effectively and economically grinds a surface in a short time period by providing fast stock removal while introducing minimal surface and subsurface damage and scratching.

SUMMARY

The present disclosure is directed to an abrasive article for polishing, finishing, or otherwise providing a desired finish on a workpieces, such as on hard drive media or disks. Unlike conventional abrasive articles which have a tendency to chip and scratch workpieces that are hard and/or brittle, the abrasive articles of the present disclosure provide a fine and scratch-free surface with minimal surface damage. The construction of the abrasive article is particularly useful with abrasive particles having an average particle dimension of about 10 micrometers and less, and is especially useful with abrasive particles having an average particle dimension of about 6 micrometers and less. In some embodiments, the abrasive article is useful with abrasive particles having an average particle dimension of about 3 micrometers and less.

The abrasive article is formed from a plurality of abrasive composites or agglomerates bonded together in a material to create an abrasive article. Each composite has a plurality of primary abrasive particles bonded by a first binder matrix; the primary abrasive particles can be individual abrasive particles or aggregates of abrasive particles. When viewed from the perspective of the overall abrasive article, the abrasive composites act as abrasive particles; when viewed from the perspective of the abrasive composites, each abrasive composite is an abrasive tool or article, and the primary abrasive particles are individual abrasive particles.

The abrasive article is a three-dimensional abrasive article, having a thickness that is greater than the thickness of one abrasive composite. The abrasive article has a thickness that is greater than the thickness of at least 1 abrasive composite, preferably at least 5 abrasive composites, and more preferably is greater than the thickness of at least 10 abrasive composites.

In one embodiment, an abrasive article, such as a grinding wheel, is provided by bonding primary, abrasive particles with an inorganic first binder matrix to form abrasive composites. These abrasive composites, in turn, are bonded together to form the abrasive article.

The abrasive article includes (1) pores disposed within the abrasive composites and (2) between and among the abrasive composites; these porosities are referred to as "intra-composite" porosity and "inter-composite" porosity respectively. Typical levels of intra-composite porosity are about 5 to 60 volume percent, although in some embodiments, it may be desired to minimize the intra-composite porosity; that is, it can be desired to have the intra-composite porosity approaching zero percent. As a consequence of the composite formation process, some level of intra-composite porosity is typically present; it may be desired to introduce additional porosity in some embodiments. Inter-composite porosity is between and among the abrasive composites. Typical levels of inter-composite porosity are about 25 to 75 volume percent. Of this porosity, the ratio of the two porosities, that is, the ratio of the intra-composite to the inter-composite porosity, can range from about 1:2 to 2:1, or can vary from this. Typically, the level of intra-composite porosity will differ from the level of inter-composite porosity.

The combination of inter- and intra-composite porosity allows the use of much smaller primary abrasive particles than have been useful in related articles of the art. These articles combine an unusually high cut rate with a fine surface finish.

The abrasive composites are formed with an organic or inorganic first binder matrix bonding the primary abrasive particles together. The composites can be regularly shaped or irregularly shaped. Examples of inorganic first binder matrixes include metals, ceramics, glasses, and oxides. Preferably, an inorganic first binder matrix, such as a ceramic matrix or a glass matrix, is used. In one particular embodiment, primary abrasive particles, such as diamond particles, having an average particle dimension of about 0.1 to 1 micrometer, are formed into regularly shaped, cube-like abrasive composites having an average dimension of about 90 micrometers.

These abrasive composites are then bonded, for example, with a second binder material, to form an abrasive article having about 20 to 65% porosity. That is, about 20 to 65% of the volume of the abrasive article is free of both second binder material and abrasive composites. The second binder material is an inorganic material, such as a ceramic or a glass. In one embodiment, the abrasive composites are bonded to form an abrasive article having about 20 to 55% porosity. This porosity may be distributed throughout the abrasive article as any combination of intra-composite and inter-composite porosity. In some embodiments, the second binder material may be present at a level higher than a preferred level; this may be preferred when the second binder material is a relatively soft, or erodible material.

The abrasive article can be a unitary article, such as grinding wheel or stone, or can be composed of multiple segments of bonded abrasive composites.

DETAILED DESCRIPTION

Figure 1:
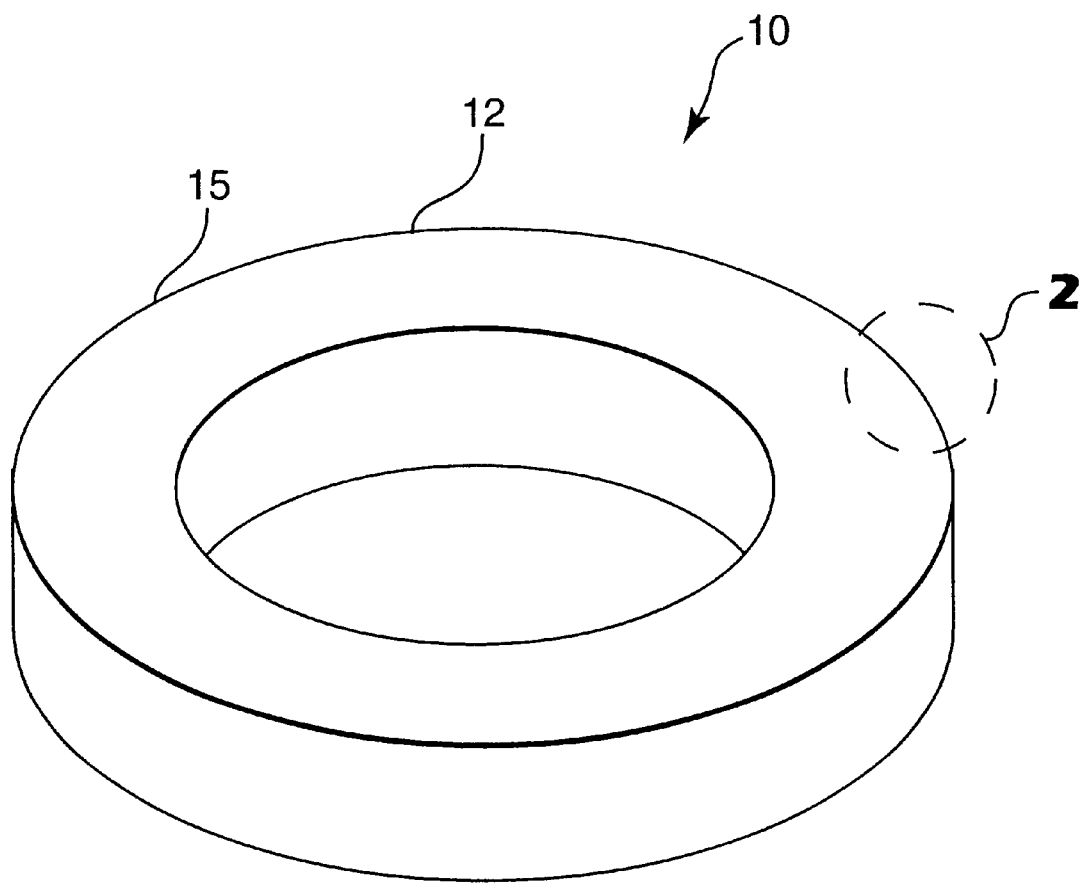
FIG. 1 is a perspective view of an abrasive article according to the present disclosure.

The present disclosure will be described in detail in reference to the accompanying Figures. FIG. 1 shows an abrasive article 10 in accordance with the present disclosure. The abrasive article 10 of FIG. 1 is a shaped, three-dimensional structure 12 in the form of a grinding wheel 15. Abrasive article 10 is composed of a plurality of abrasive composites bonded together to form article 10. Throughout this disclosure, the terms "abrasive composite", "abrasive agglomerate", and derivations thereof, are used interchangeably. Each of these terms refers to a plurality of primary abrasive particles bonded together by a first binder matrix to form a unitary particulate mass. Throughout this disclosure, "primary abrasive particle" is used to refer to the abrasive particles that are bonded together to form the abrasive composite. As will be described in detailed below, the primary abrasive particles may be individual abrasive particles or aggregates of particles.

The abrasive article of the present invention includes a plurality of abrasive composites or agglomerates bonded together by a second binder material to form an abrasive article.

Inter-composite porosity, positioned between and among the abrasive composites, is present in the abrasive article. Also present in the abrasive article is intra-composite porosity, which is within the abrasive composites and is positioned between and among the primary abrasive particles.

Abrasive Composites or Agglomerates

The abrasive composites or agglomerates which provide the overall structure of the abrasive article are constructed from a plurality of primary abrasive particles dispersed in a first binder matrix. Intra-composite porosity, within the abrasive composite between and among the primary abrasive particles, is typically present in the abrasive composite at a level of about 5 to 60 volume percent.

Figure 2:
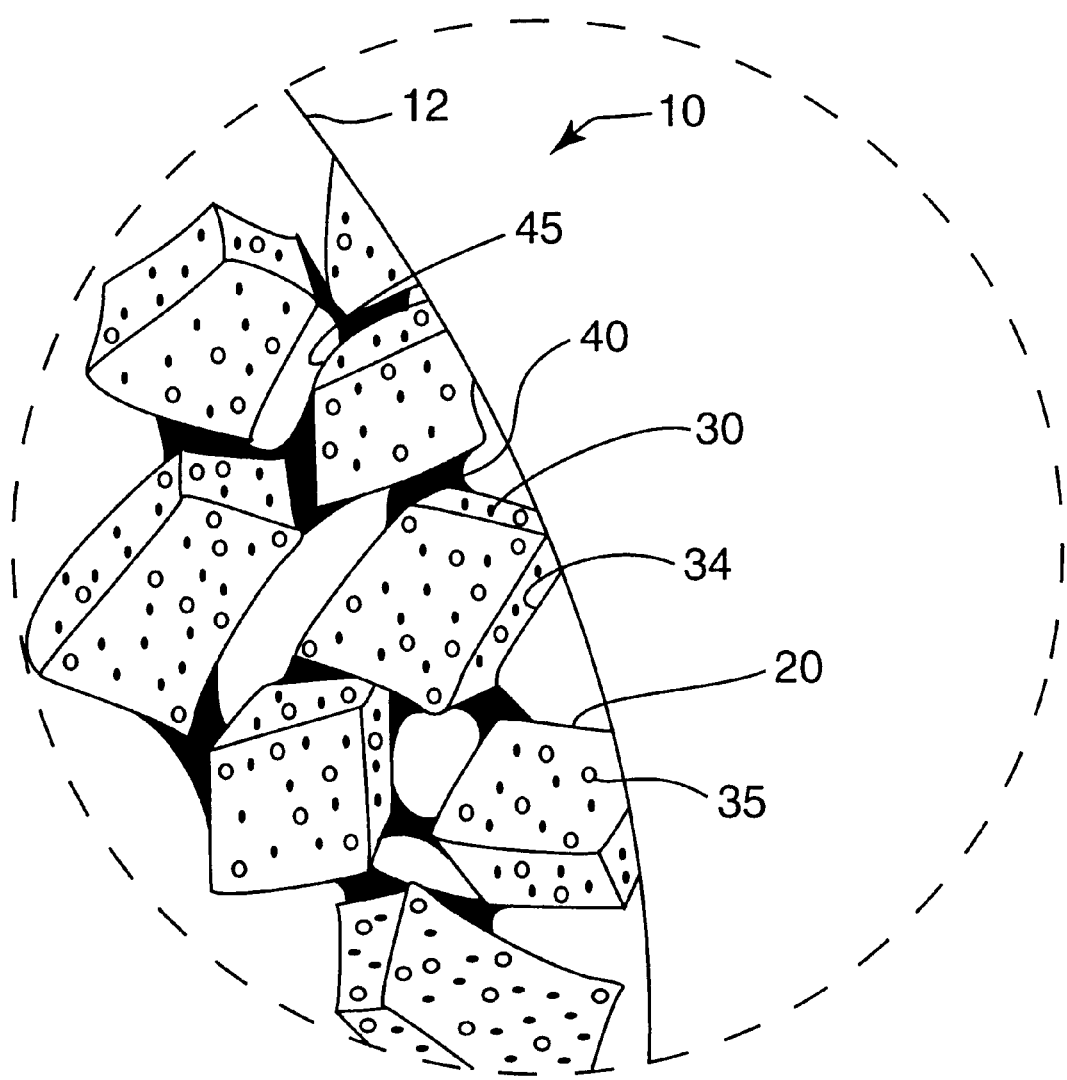
FIG. 2 is an enlarged view of a portion of the abrasive article of FIG. 1, showing the arrangement of abrasive composites within the abrasive article.

Referring to FIG. 2, a greatly enlarged portion of abrasive article 10 of FIG. 1, designated at "2", is shown. The abrasive article 10 comprises a plurality of abrasive composites 20 bonded by second binder material 40 to form a shaped, three-dimensional mass 12. Each abrasive composite 20 comprises primary abrasive particles 30 dispersed within first binder matrix 34. Composite 20 can also include intra-composite pores 35.

The abrasive composites can be precisely shaped or irregularly shaped. A "precisely or regularly shaped abrasive composite" refers to an abrasive composite having a molded shape that is the inverse of the mold cavity in which the composite was formed. The shape is retained by the composite after the composite has been removed from the mold. In another embodiment, a precisely or regularly shaped abrasive composite is spherical, such as a solidified droplet. In any shape, the precisely or regularly shaped abrasive composite is substantially free of abrasive particles protruding beyond the exposed surface of the composite before the abrasive article has been used. Example methods of making precisely shaped abrasive composites by using molding techniques are described in U.S. Pat. Nos. 5,152,917 (Pieper et al.) and 5,975,988 (Christianson), both incorporated herein by reference. An "irregularly shaped abrasive composite" refers to an abrasive composite having a non-precise or irregular shape. The shape is formed, for example, by crushing a larger particle to form the irregularly shaped abrasive composite.

A combination of precisely and irregularly shaped composites can be present in an abrasive article. Typically, the precisely shaped composites are about the same size. Irregularly shaped abrasive composites are typically graded according to their size to provide a relatively uniform abrasive composite size within a given abrasive article.

The precisely or regularly shaped composites generally have a precise geometric shape. Initially, a plurality of primary abrasive particles generally will be present on the surface of the composite; it is preferred that the primary abrasive particles do not protrude beyond the surface of the abrasive composite. As the abrasive article is used to abrade a workpiece, the first binder matrix breaks down to reveal new abrasive particles. By the abrasive composite eroding and revealing new abrasive particles, the abrasive composite, and the overall abrasive article, is providing a self-dressing function; that is, the abrasive article is exposing fresh abrasive particles during the grinding process.

The shape of the abrasive composite may be selected from any number of geometric shapes, for example, cubic, block-like, cylindrical, prismatic, pyramidal, truncated pyramidal, conical, truncated conical, spherical, or any three-dimensional shape. The shape, although precise, can be irregular; for example, the cross-sectional shape of the base maybe different than the top surface. Another useable shape is hemispherical, which is described in U.S. Pat. No. 5,681,217 (Hoopman et al.). In general, the abrasive composites may have any frustum shape; a frustum being defined as the parts of a solid figure between two planes bisecting that solid figure; often, the two planes are parallel. It is generally preferred to have a relatively constant surface area of contact between the workpiece surface and the abrasive article as the abrasive article wears.

The abrasive article can have a mixture of different abrasive composite shapes and/or dimensions; however, it is generally preferred that abrasive composites having generally the same dimension are used in a given abrasive article.

The average dimension of the abrasive composites, whether precisely shaped or irregular, should be at least about 5 micrometers. Alternately or additionally, the average dimension of the abrasive composites is no greater than about 1000 micrometers. Typically the abrasive composite has an average dimension of about 10 to 800 micrometers, preferably about 20 to 600 micrometers. A general rule is that the abrasive composite has a median dimension that is at least 3 times larger than the largest linear dimension of the primary abrasive particles within the composite, preferably at least 5 times larger.

Primary Abrasive Particles

The primary abrasive particles used in the abrasive composites of the abrasive article of the present disclosure can be any abrasive particle. The primary abrasive particles can be individual abrasive particles or can be aggregates or agglomerates of individual abrasive particles. Preferably, the primary abrasive particles, in particular aggregates of individual particles, have minimal, if any, second binder material providing the structure of the aggregate. Aggregates of individual abrasive particles may be held together, for example, by mechanical interaction between the particles or by intra-particle forces, such as Vander Waal forces.

The primary abrasive particles preferably have an average particle dimension of about 0.01 micrometer to 100 micrometers, more preferably about 0.05 micrometer to about 50 micrometers, and even more preferably about 1 micrometer to about 10 micrometers. Occasionally, abrasive particle sizes are reported as "mesh" or "grade", both of which are commonly known abrasive particle sizing methods.

The abrasive article of the present disclosure is particularly useful with primary abrasive particles having an average particle dimension of about 10 micrometers and less, and is especially useful with primary abrasive particles having an average particle dimension of about 6 micrometers and less. Additionally, primary abrasive particles having an average particle dimension of about 3 micrometers and less can be easily formulated into abrasive articles in accordance with the present disclosure.

The primary abrasive particles within an abrasive composite are generally all from the same mesh or grade; they generally fall within a standard bell-curve distribution of particle sizes with a central average particle dimension. However, in some embodiments, a bimodal distribution of particles sizes can be used. A bimodal distribution can be achieved, for example, by mixing an amount of primary abrasive particles having an average particle dimension of about 10 micrometers with an amount of primary abrasive particles having an average particle dimension of about 3 micrometers. It is preferred that no matter what particle size distribution is used for the primary abrasive particles, that the particles within the composite do not overly pack together and unacceptably reduce the intra-porosity within the composite.

It is preferred that the abrasive particles have a Mohs hardness of at least 8, more preferably at least 9. Examples of suitable abrasive particles include aluminum oxide, including fused aluminum oxide, heat treated aluminum oxide, white fused aluminum oxide, ceramic aluminum oxide (such as sol gel derived alumina), black silicon carbide, green silicon carbide, titanium diboride, boron carbide, silicon nitride, tungsten carbide, titanium carbide, garnet, fused alumina zirconia, diamond, cubic boron nitride, hexagonal boron nitride, and the like. The diamond and boron nitride abrasive particles may be monocrystalline or polycrystalline.

Examples of alumina-based sol gel derived abrasive particles can be found in U.S. Pat. Nos. 4,314,827 (Leitheiser et al.); 4,623,364 (Cottringer); 4,744,802 (Schwabel); 4,770,671 (Monroe); and 4,881,951 (Monroe et al.), all incorporated herein by reference. The sol gel derived alumina abrasive particle may contain a metal oxide modifier.

For glass polishing and grinding applications, diamond abrasive particles are preferred. The diamond abrasive particles may be natural or synthetically made diamond; the diamonds may be "resin bond diamonds", "saw blade grade diamonds", or "metal bond diamonds". The diamond abrasive particles may have a blocky shape associated with them, or alternatively, a needle like shape. The single diamond particles can contain a surface coating such as a metal coating (for example, nickel, aluminum, copper or the like), an inorganic coating (for example, silica), or an organic coating. An example of polycrystalline diamond particles is commercially available from Mypodiamond Inc. under the trade designation "Mypolex". The abrasive article of the invention can contain a blend of diamond particles with other abrasive particles.

The abrasive composites are about 10 to 90 percent by weight primary abrasive particles and 90 to 10 percent first binder matrix. Typically, the abrasive composites are about 15 to 85 percent primary abrasive particles and 85 to 15 percent first binder matrix.

First Binder Matrix

A first binder matrix holds the primary abrasive particles together; together, the primary abrasive particles and first binder matrix form the abrasive composite. Examples of usable binders include organic binders (such as phenolics, acrylates, polyamides, and the like) and inorganic binders. Examples of inorganic binders include metal binders (such as nickel) and ceramic binders. Preferably, the binder is a "ceramic binder", which includes ceramics, glass-ceramics, and glasses (also referred to as vitreous or vitrified binders). These materials generally fall within the same category when considering atomic structure. The bonding of the adjacent atoms is the result of process of electron transfer or electron shaping. Alternatively, weaker bonds as a result of attraction of positive and negative charge, known as secondary charge, can exist. Crystalline ceramics, glass and glass-ceramics have ionic and covalent bonding. Ionic bonding is achieved as a result of electron transfer from one atom to another. Covalent bonding is the result of sharing valence electrons and is highly directional. By way of comparison, the primary bond in metals is known as a metallic bond and involves non-directional sharing of electrons.

Crystalline ceramics can be subdivided into silica-based (silicates such as fireclay, mullite, porcelain, and Portland cement), non-silicate oxides (such as alumina, magnesia, $MgAl_2O_4$, and zirconia), and non-oxide ceramics (such as carbides, nitrides, and graphite).

Non-crystalline glasses are comparable in composition with crystalline ceramics. As a result of specific processing techniques, these materials do not have the long range order that crystalline ceramics have. Glass-ceramics are the result of controlled heat-treatment to produce over 90% crystalline phase or phases with the remaining non-crystalline phase filling the grain boundaries. Glass ceramics combine the advantage of both ceramics and glasses and offer durable mechanical and physical properties.

Preferred first binder matrixes, in particular ceramic matrixes, are glasses that include metals oxides, for example, aluminum oxide, boron oxide, silicon oxide, magnesium oxide, sodium oxide, manganese oxide, zinc oxide, and mixtures thereof. A preferred ceramic matrix is alumina-borosilicate glass comprising $Si_2O$, $B_2O_3$, and $Al_2O_3$. A preferred alumina-borosilicate glass comprises, by weight, about 18% $B_2O_3$, 8.5% $Al_2O_3$, 2.8% BaO, 1.1% CaO, 2.1% $Na_2O$, 1.0% $Li_2O$, with the balance being $Si_2O$. Such an alumina-borosilicate glass, having a particle size of less than about 45 mm, is commercially available from Specialty Glass Incorporated, Oldsmar, Fla.

The abrasive composites are generally made by mixing together a temporary binder, a first binder matrix precursor, abrasive particles, and a sufficient amount of solvent, typically water, to facilitate molding the ingredients. The resulting mixture is a moldable paste or slurry. This moldable slurry is placed into a suitable mold, dried, and the at least partially hardened abrasive composite precursors are removed. The abrasive composite precursors are then converted to abrasive composites, for example, by firing or sintering the composite precursors.

Intra-Composite Porosity

The abrasive composites of the abrasive articles of the present disclosure are porous and preferably have a measurable porosity. As used herein, the term "porous" can be used to describe either or both the structure of the abrasive composite, which is characterized by having pores or voids distributed throughout the abrasive composite among the abrasive particles, or the structure of the abrasive article, which is characterized by having pores or voids distributed through its mass among the abrasive composites. In particular, "intra-composite porosity" is the porosity distributed throughout the abrasive composite; "inter-composite porosity" is the porosity distributed among the abrasive composites. In some embodiments, either or both of the "intra-composite porosity" and the "inter-composite porosity" may be positioned wholly within the first binder matrix (for intra-composite) and the second binder material (for inter-composite).

The intra-composite porosity extends between and among the primary abrasive particles, and can be open to the external surface of the composite or can be sealed within the composite. The pores may be defined by both primary abrasive particles and first binder matrix, or wholly by first binder matrix. Intra-composite porosity is believed to modify the mechanical properties of the composite and to aid in the controlled breakdown of the abrasive composites leading to a release of used (i.e., dull) abrasive particles from the composites. The pores in the composites may increase the performance (e.g., the cut rate and/or surface finish) of the final abrasive article by providing a path for removal of swarf and used abrasive particles from the interface between the abrasive article and the workpiece. Pores also facilitate coolant and lubricant transport to the grinding or polishing interface.

Typically, the intra-composite porosity, that is, the pores between the individual abrasive particles, occupies at least about 4% of the volume of the composite, although in some embodiments it may be desired to have the intra-composite porosity approaching zero percent. Alternately or additionally, the pores occupy no greater than about 70% of the volume of the composite. Typically, the pores occupy about 5% to 60% of the volume, preferably about 6% to 50%. A porous first binder matrix can be formed by well known techniques, for example, by controlled firing of a matrix precursor or by the inclusion of pore forming agents, such as glass bubbles, in the matrix precursor. Composites having high levels of intra-composite porosity generally require a first binder matrix having a high mechanical strength.

The abrasive composites may further contain other additives such as fillers, grinding aids, pigments, adhesion promoters, cutting aids, and other processing materials. These additives may be positioned within the pores of the composite, be provided as coatings on the primary abrasive particles, or be dispersed throughout the first binder matrix.

Preferred Abrasive Composites

In one particular embodiment, individual diamond particles, having an average particle dimension of about 0.1 micrometer, are formed into abrasive composites with an alumina-borosilicate first binder matrix. The abrasive composites, with a composite porosity of about 29%, have a truncated pyramidal shape with an average dimension of about 90 micrometers.

In another particular embodiment, individual diamond particles, having an average particle dimension of about 1.5 micrometers, are formed into abrasive composites with an alumina-borosilicate first binder matrix. The abrasive composites, with a composite porosity of about 5–10%, have a truncated pyramidal shape with an average dimension of about 90 micrometers.

Method of Making an Abrasive Composite

A method for making an abrasive composite or agglomerate useful in the abrasive article of the present disclosure comprises, for example, mixing starting materials comprising a first binder matrix precursor, abrasive particles, and a temporary organic binder precursor. The first binder matrix precursor will be converted to the first binder matrix. The temporary organic binder precursor permits the mixture to be more easily shaped and to retain this shape during further processing; typically, the temporary organic binder precursor is sacrificed (e.g., burned off) during the final steps of making the abrasive composite. Optionally, other additives and processing aids, e.g., inorganic fillers, grinding aids, and/or a liquid medium may be used.

These starting materials can be mixed together by any conventional technique which results in a uniform mixture. Preferably, the abrasive particles are mixed thoroughly with a temporary organic binder precursor in a mechanical mixing device such as a planetary mixer. The binder precursor is then added to the resulting mixture and blended until a homogeneous mixture is achieved, typically 10 to 30 minutes. For finer primary abrasive particles, the preferred method for mixing the abrasive particles and binder precursor can be to use an ultrasonic bath, for a typical period of about 20 to 30 minutes, with the help of an ultrasonic cleaner (such as available from Branson or Cole-Palmer), which vibrate at approximately 47,000 to 50,000 cycles per second.

The mixture resembles a paste or slurry that is then shaped and processed to form composite precursors. The mixture may be shaped, for example, by molding, extrusion, and die cutting. The mixture may alternately be shaped by passing it through a screen, or coating it onto a web using a rotogravure roll, for example. There will typically be some shrinkage associated with the loss of the temporary organic binder precursor; this shrinkage should be taken into account when determining the desired shape and dimension of the abrasive composite. The shaping process can be done in a batch process or in a continuous manner. One preferred technique for shaping the abrasive composite is to place the starting materials, which have been combined and formed into a homogenous mixture, into a flexible mold. For example, if abrasive composites in the shape of a truncated pyramid are to be formed, the mold will be imprinted with this shape. The flexible mold can be any mold which allows for easy release of the particles, for example, a silicone or polypropylene mold. Additionally, the mold may contain a release agent to aid in the removal of the dried composites. The mold, containing the mixture, is then placed in an oven and heated to least partially remove any liquid. The temperature depends on the temporary organic binder precursor that may be used, and is typically between 35 to 200° C., preferably, 70 to 150° C. The at least partially dried or hardened mixture is then removed from the mold. It is also possible to completely destroy, i.e., completely burn off the mold, to release the composites.

The abrasive composites can include a coating of inorganic particles to increase the surface area and also minimize the aggregation of the abrasive composites with one another during their manufacture. One method to achieve the coating is to mix the composite precursors after they are shaped, e.g., removed from the mold, with the inorganic particles in order to apply the inorganic particles, e.g. abrasive particles, to the composite precursor. A small amount of water and/or solvent, or temporary organic binder precursor, for example, in an amount ranging from 5 to 15 weight %, preferably from 6 to 12 weight %, based on the weight of the composite precursor, may also be added to aid in securing the inorganic particles to the surface of the abrasive composite precursor.

The composite precursors are then heated to burn off any organic materials used to prepare the composite precursors, for example, the temporary organic binder, and to melt or vitrify the inorganic binder; this may occur separately or as one continuous step. The temperature and rate of heating to burn off the organic materials is selected to avoid excessive bubbles which may result in undesirably sized pores in the abrasive composite and generally depends on the chemistry of the optional ingredients including the temporary organic binder precursor. Typically, the temperature for burning off organic materials ranges from about 100 to 600° C., preferably from 200 to 500° C., although higher temperatures are usable. The temperature for melting or vitrifying the inorganic binder typically ranges between 600 to 1150° C., preferably between 600 to 950° C. In some methods, the binder may not be fully vitrified or hardened; rather, only a partial vitrification or hardening may be done.

The resulting composites can then be thermally processed to optimize bond properties. The thermal processing comprises heating at a temperature ranging from 300 to 900° C., preferably 350 to 800° C., and more preferably 400 to 700° C.

Abrasive Articles

Figure 6:
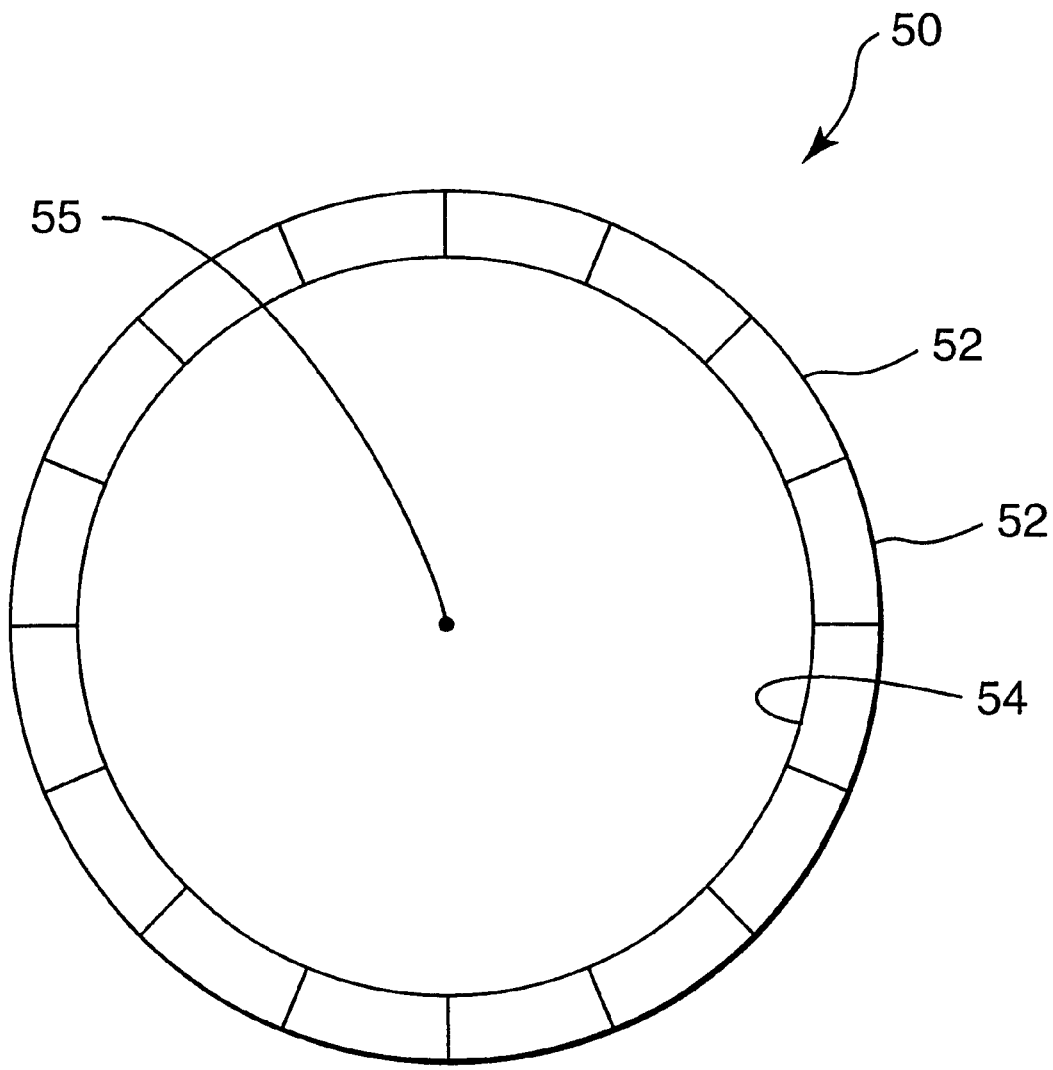
FIG. 6 is a side plan view of a second embodiment of an abrasive article according to the present disclosure.

The abrasive composites, each being a mixture of primary abrasive particles and a first binder matrix, and optionally yet preferably having intra-composite porosity, are molded to form a three dimensional abrasive article, such as abrasive article 10 in FIG. 1 and abrasive article 50 in FIG. 6. The abrasive article is a three-dimensional abrasive article; that is, the thickness of the abrasive composites within the article is typically greater than the thickness of a mono-layer of abrasive composites. The thickness of the layer of the abrasive composites is greater than the largest dimension of one abrasive composite. Preferably, the thickness of the layer of abrasive composites is greater than 5 times the largest dimension of the abrasive composites, more preferably greater than 10 times the largest dimension of the abrasive composites.

The abrasive article can be a single piece, such as grinding wheel 15 of FIG. 1, or the abrasive article can be made from a plurality of segments 52, such as shown in abrasive article 50 of FIG. 6. In FIG. 6, segments 52 each occupy a portion of the circumference of hub 54. An axial hole 55 is used to mount the abrasive article 50 on a spindle or the like.

The abrasive article, or a portion of the abrasive article (i.e., segment), is formed by molding or otherwise bonding a plurality of abrasive composites or agglomerates together into a shaped mass. Typically, this is done by the application of heat and pressure while the abrasive composites are retained within a mold. Such molding techniques are well known.

During the molding step, the abrasive composites may be only at least partially dried, hardened or vitrified, or may be fully hardened or vitrified. If a non-filly hardened or vitrified abrasive composite is molded to form the final abrasive article, it is desired that the level of intra-composite porosity within the composite changes no more than about 5%, preferably no more than 2% from the prior-to-molding level to the after-molding level. Further, the abrasive composite retains its form, e.g., its shape and size, during the molding process. The abrasive composite does not loose its individual integrity once incorporated into the abrasive article.

Abrasive Article Binder

The abrasive composites are molded to form the abrasive article in accordance with the present disclosure, and typically a second binder material is added to facilitate the bonding together of the composites. The amount of second binder material is preferably minimal, so that the second binder material is located between the abrasive composites, with volumes devoid of second binder material and composites, thus creating inter-composite porosity.

Examples of usable second binder materials include organic second binder materials (such as phenolics, acrylates, polyamides, and the like) and inorganic second binder materials. Examples of inorganic second binder materials include metal binders (such as nickel) and ceramic second binder materials. Preferably, the second binder material is a "ceramic binder". The term "ceramic binder" is loosely used to include ceramics, glass-ceramics, and glasses (also referred to as vitreous or vitrified). Refractory particles may be combined with a glass to form a binder composite; such particles typically are used to modify the coefficient of thermal expansion, the melt viscosity, and the mechanical properties of the binder material.

Referring to FIG. 2, second binder material 40 bonds abrasive composites 20 together to form the shaped, three-dimensional article 12. Second binder material 40, together with abrasive composites 20, define inter-composite pores 45. In FIG. 2, composites 20 are dispersed randomly throughout abrasive article 10.

Figure 3:
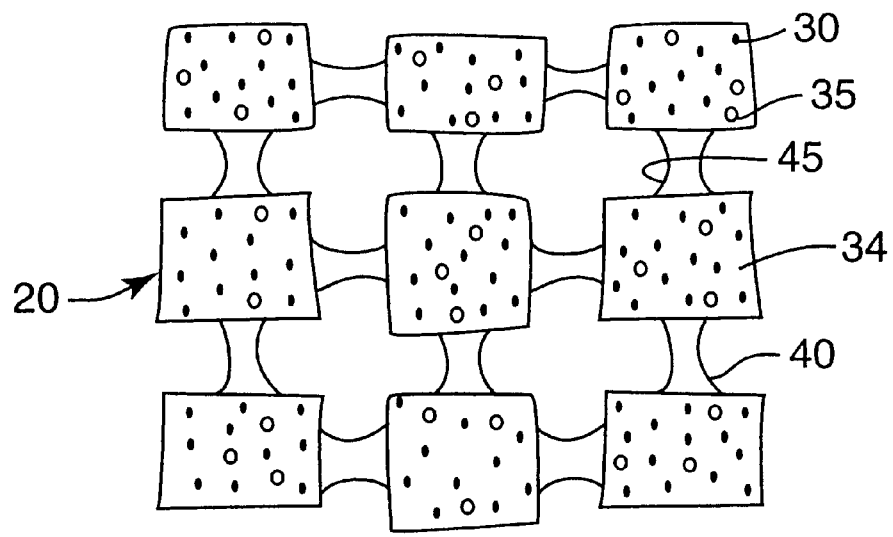
FIG. 3 is an enlarged view of an alternate embodiment of an arrangement of abrasive composites.

In FIG. 3, abrasive composites 20, with primary abrasive particles 30 bonded within first binder matrix 34 and having intra-composite pores 35, are bonded by second binder material 40 in an ordered, geometric pattern, similar to a checkerboard pattern. Inter-composite pores 45 are defined by second binder material 40 and composites 20. FIG. 3 shows a single layer of bonded composites 20; it is understood that this geometric pattern can continue throughout the depth of the abrasive article. Any pattern of abrasive composites, such as shown in FIG. 3, can be continued throughout the depth of the abrasive article.

Figure 4:
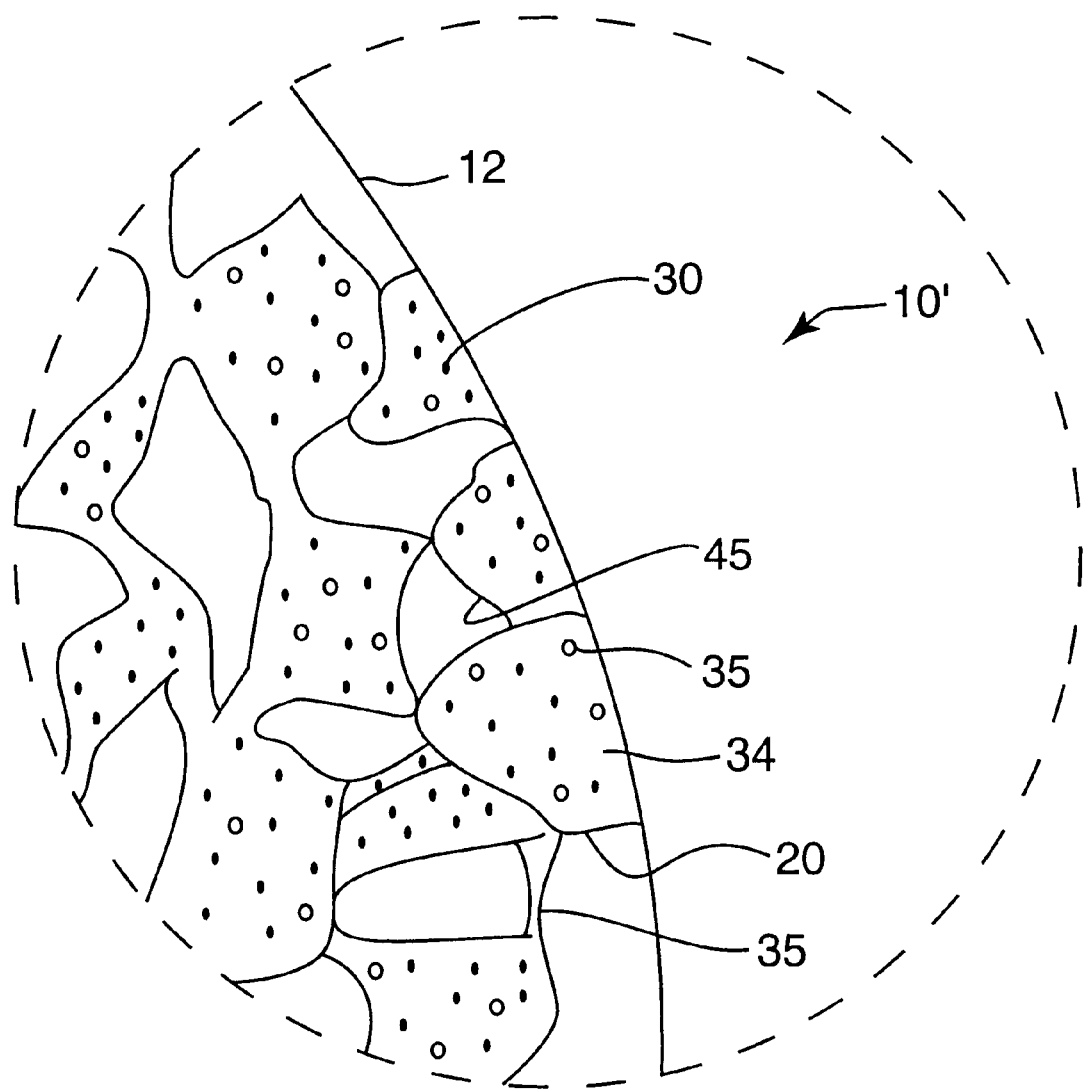
FIG. 4 is an enlarged view of a portion of another alternate embodiment of an abrasive article, similar to the view of FIG. 2, showing the arrangement of abrasive composites within the abrasive article.

In some embodiments, no extra second binder material is used to bond the composites together to form the abrasive article; rather, the first binder matrix of the abrasive composites themselves bonds the composites together. See, for example, abrasive article 10' in FIG. 4, where first binder matrix 34, that which binds the individual abrasive particles 30 within composites 20, also binds multiple composites 20 together. First binder matrix 34 defines inter-composite pores 45, and may also define intra-composite pores 35.

Abrasive article 10', without a second binder material (i.e., only having first binder matrix 34 and no second binder material 40 as in abrasive article 10 of FIG. 2), can be made by heating the abrasive composites to a temperature so that first binder matrix 34 begins to flow and fuse the composites together.

In some embodiments, it may be desired to mold a plurality of composite precursors (that is, unfired, unsintered, non-vitrified, unhardened composites) or only partially fired, sintered, vitrified, or hardened composites. In such an embodiment, the complete firing of the composites, and the firing of the abrasive article, are accomplished in a single heating step. It is understood that during the single heating step, the composites retain their integrity (e.g., shape, size, intra-composite porosity, etc.).

Figure 5:
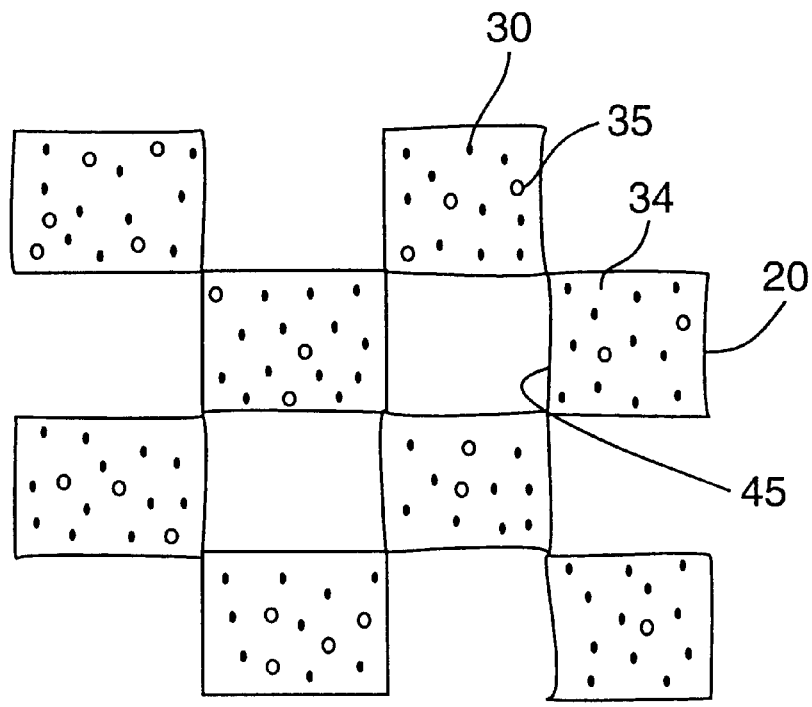
FIG. 5 is an enlarged view of yet another alternate embodiment of an arrangement of abrasive composites.

Another embodiment is depicted in FIG. 5, where abrasive composites 20, with primary abrasive particles 30 bonded within first binder matrix 34 and having intra-composite pores 35, are bonded in an ordered, geometric pattern. Composites 20 are bonded together by first binder matrix 34, the same as provides the structure is composites 20. Inter-composite pores 45 are defined by composites 20. FIG. 5 shows a single layer of bonded composites 20; it is understood that this geometric pattern can continue throughout the depth of the abrasive article.

Inter-Composite Porosity

The abrasive article of the present disclosure is porous and preferably has a measurable porosity. As used herein, the term "porous" can be used to describe either or both the structure of the abrasive composite, which is characterized by having pores or voids distributed throughout its mass, or the structure of the abrasive article, which is characterized by having pores or voids distributed among and between the abrasive composites. The pores are defined by the abrasive composites and any second binder material that may be present. Preferably, the pores are void of any material. In some embodiments, it is preferred that the majority of the porosity of the abrasive article is inter-composite porosity; that is, that majority of the porosity is between the composites rather than within the composites.

The inter-composite pores within the abrasive article extend between and among the abrasive composites and any second binder material, and can be open to the external surface of the abrasive article or can be sealed. Pores within the abrasive article are believed to aid in the controlled breakdown of the abrasive composites leading to a release of used (i.e., dull) abrasive particles from the composites. Both inter-composites pores and intra-composite pores may increase the performance (e.g., the cut rate and/or surface finish) of the abrasive article by providing a path for the removal of swarf and used abrasive particles from the interface between the abrasive article and the workpiece.

Typically, the inter-composite pores within the abrasive article, that is, the pores between the abrasive composites and any second binder material, occupy at least 20% of the volume of the abrasive article. Alternately or additionally, the pores occupy no more than about 80%. Typically, the inter-composite porosity is about 25 to 75%, preferably about 30 to 60%, of the volume of the abrasive article. In most embodiments, the majority of the porosity within the abrasive article is inter-composite porosity, disposed between the abrasive composites.

The particular preferred volume percent of inter-composite porosity is dependent on the average particle dimension of the abrasive composites, the dimension of the primary abrasive particles forming the abrasive composites, and the amount of intra-composite porosity. Further, the volume percent of the pores will depend on any second binder material used to bond the abrasive composites together to form the abrasive article. The abrasive article should have sufficient strength to be able to withstand the forces exerted during grinding or polishing; the porosity within the abrasive article should not unduly weaken the abrasive article. It should not result in an abrasive article that is significantly weaker than the individual abrasive composites.

The abrasive articles may further contain other additives such as fillers, grinding aids, pigments, adhesion promoters, cutting aids, and other materials. These additives may be positioned within the inter-composite pores of the composite, be provided as coatings on the abrasive composites, be dispersed throughout the second binder material, or within the inter- or intra-composite pores of the abrasive article.

Preferred Abrasive Articles

In one particular embodiment, individual diamond particles, having an average particle dimension of about 0.1 micrometer, are formed into abrasive composites with an alumina-borosilicate first binder matrix. The abrasive composites, with an intra-composite porosity of about 29%, have a truncated pyramidal shape with an average dimension of about 90 micrometers. These abrasive composites are then bonded with an epoxy binder (commercially available as "Epon 828" from Shell) to form an abrasive article having about 33% abrasive composites by volume, 33% organic binder by volume, and 33% inter-composite porosity.

In another particular embodiment, individual diamond particles, having an average particle dimension of about 1 micrometer, are formed into abrasive composites with an alumina-borosilicate first binder matrix. The abrasive composites, with an intra-composite porosity of about 5–10%, have a truncated pyramidal shape with an average dimension of about 90 micrometers. These abrasive composites are placed into a mold, heated to a temperature suitable to cause a portion of the alumina-borosilicate first binder matrix to flow, thereby causing the first binder matrix to bond the composites together. No additional binder is needed to form the abrasive article. The resulting abrasive article is about 50% abrasive composites by volume and 50% inter-composite porosity.

Method of Grinding Glass Workpieces

Glass workpieces that are often ground, polished, finished, abraded, fined or otherwise treated with abrasive articles include lenses, prisms, mirrors, CRT screens, windows, automobile and other windshields, hard drive substrates, and other glass items. Many various machines, grinders, polishers, and the like can be used to grind glass workpieces with the abrasive articles of the present disclosure. The particular method used to grind the glass workpiece is depending on the type of workpiece and the desired effect.

The glass workpieces are typically ground by moving at least one of the glass workpiece and the abrasive article in relation to the other. This movement may be rotary, random, linear, or various combinations. Rotary motion may be generated by attaching the abrasive article to a rotary tool or by placing the glass workpiece on a rotating holder. A random orbital motion may be generated by a random orbital tool, and linear motion may be generated by a continuous abrasive belt. The glass surface and abrasive article may rotate in the same direction or opposite directions. Operating rpm may range up to about 4,000 rpm, depending on the abrasive article employed. The relative movement between glass and abrasive article may also depend on the dimensions of the glass. If the glass is relatively large, it may be preferred to move the abrasive article during grinding while the glass is held stationary.

During grinding, the abrasive article and the glass surface preferably have an interface pressure of about 0.1 kg/cm$^2$ to about 2 kg/cm$^2$, more preferably about 0.25 to 1.25 kg/cm$^2$, and even more preferably about 0.4 to 0.85 kg/cm$^2$. If the force is too high, the abrasive article may not refine the scratch depth but rather increase the scratch depth. Also, the abrasive article may wear excessively. If the force is too low, the abrasive article may not effectively remove sufficient glass material.

It is preferred to grind the glass in the presence of a liquid, commonly referred to as a coolant. In some instances it is preferred to grind the glass in the presence of a liquid referred to as a "lubricant". The liquid inhibits heat build up during grinding and removes the swarf from the grinding interface. "Swarf" is the term used to describe the glass debris that is abraded away by the abrasive article. In some instances, the glass swarf may damage the surface of the glass being ground. Thus, it is desirable to remove the swarf from the interface.

The invention will be further described and illustrated in the examples which follow. The examples are illustrative of the invention and should not be construed as limiting the scope to their details. All parts, percentages, ratios, etc. are by weight unless otherwise specified.

EXAMPLES

To make abrasive composites, a temporary binder solution was prepared by dissolving 25 parts by weight "Stadex 230" dextrin (obtained from A.E. Stanley Manufacturing Co. of Decatur, Ill.) in 75 parts de-ionized water. A slurry of 120.0 g of the dextrin solution, 120.0 g alumina-borosilicate glass (having a nominal composition of 18% $B_2O_3$, 8.5% $Al_2O_3$, 2.8% BaO, 1.1% CaO, 2.1% $Na_2O$, 2.9% $K_2O$, 1.0% $Li_2O$, and 63.6% $Si_2O$; obtained from Specialty Glass Inc. of Oldsmar, Fla.), and 120.0 g diamonds (average particle dimension about 1.5 micrometers; obtained from American Boarts Crushing Co., Inc. of Boca Raton, Fla.) was thoroughly stirred with a propeller mixing blade for five minutes followed by agitation in an ultrasonic bath (model 8852 from Cole-Palmer Instrument Co. of Chicago, Ill.) for 30 minutes at a frequency setting of 47 kHz. The resulting slurry was coated into the cavities of a polypropylene tool and the excess slurry was removed by a doctor blade. The cavities of the polypropylene tool were right truncated pyramids having a depth of 90 micrometers, a base of 117 by 117 micrometers, and a top of 87 by 87 micrometers.

The slurry was dried while in the cavities for one hour at room temperature, after which the tool and slurry was placed in an oven at 75° C. for one hour. The dried green composite precursors were removed from the tooling by using an ultrasonically driven bar (ultrasonically driven by a model 902R from Branson Ultrasonic Instruments of Danbury, Conn.).

The green composite precursors were fired in a refractor sager (obtained from Ipsen Ceramic of Pecatonica, Ill.). The temperature was ramped up from room temperature to 400° C. at 1.5° C./min and fired from 1 hour in an oxidizing (air) atmosphere. After firing, the abrasive composites were cooled to room temperature at a temperature decrease of about 2° C./minute.

To mold the abrasive article, a temporary binder solution was prepared by dissolving 33 parts "Stadex 230" dextrin in 66 parts deionizied water. A paste of 8 grams dextrin solution, 8 grams fired composites, 2 grams of the alumina-borosilicate glass, and 0.5 gram of "Q-Cel 2135" borosilicate glass hollow spheres (obtained from The PQ Corporation of Valley Forge, Pa.) was prepared. The paste was molded into a cylindrical grinding wheel having an outside diameter of 3.61 cm (1.42 inches), and inside diameter of 2.92 cm (1.15 inches), and a width of 0.72 cm (0.285 inch). The wheel was dried at room temperature and then placed in an oven, where the temperature was raised to 680° C. at a rate of 2°/minute and held at 680° C. for 2 hours. The wheel was allowed to cool to room temperature.

The resulting abrasive article was similar to that shown in FIGS. 1 and 2. The abrasive wheel had fine size abrasive particles and an open, porous structure.

What is claimed:

1. A shaped, three-dimensional abrasive article comprising:
    (a) a plurality of abrasive composites, the abrasive composites comprising:
        (i) a plurality of primary abrasive particles having an average particle dimension of no greater than about 10 micrometers; and
        (ii) a ceramic first binder matrix binding the plurality of abrasive particles to form the abrasive composites;
    wherein the abrasive article has an inter-composite porosity of at least 20% by volume.

2. The shaped, tree-dimensional abrasive article according to claim 1, the abrasive composites further comprising:
    (a) an intra-composite porosity of at least 5% by volume.

3. The shaped, three-dimensional abrasive article according to claim 2, wherein the intra-composite porosity is about 6 to 50% by volume.

4. The shaped, tree-dimensional abrasive article according to claim 1, further comprising:
   (a) a second binder material bonding together the plurality of abrasive composites; and
   (b) the inter-composite porosity being defined by the second binder material and the abrasive composites.

5. The shaped, three-dimensional abrasive article according to claim 1, wherein the abrasive article has an inter-composite porosity of about 25 to 75% by volume.

6. The shaped, three-dimensional abrasive article according to claim 5, wherein the abrasive article has an inter-composite porosity of about 30 to 60% by volume.

7. The shaped, three-dimensional abrasive article according to claim 1, wherein the primary abrasive particles have an average particle dimension of no greater than about 6 micrometers.

8. The shaped, three-dimensional abrasive article according to claim 7, wherein the primary abrasive particles have an average particle dimension of no greater than about 3 micrometers.

9. The shaped, three-dimensional abrasive article according to claim 1, wherein the abrasive article is a grinding wheel having a central axis of rotation.

10. The shaped, three-dimensional abrasive article according to claim 1, wherein the abrasive article comprises a plurality of abrasive segments, each abrasive segment comprising:
    (a) a plurality of abrasive composites, the abrasive composites comprising:
        (i) a plurality of primary abrasive particles having an average particle dimension of no greater than about 10 micrometers; and
        (ii) a ceramic first binder matrix binding the plurality of abrasive particles to form the abrasive composites;
    wherein the abrasive article has an inter-composite porosity of at least 20% by volume.

11. A method of making a shaped, three-dimensional abrasive article, comprising:
    (a) providing a plurality of abrasive composites, the abrasive composites comprising:
        (i) a plurality of primary abrasive particles having an average particle dimension of no greater than about 10 micrometers; and
        (ii) a ceramic first binder matrix binding the plurality of abrasive particles to form the abrasive composites;
    (b) molding the plurality of abrasive composites to form an abrasive article having a porosity between the abrasive composites of at least 20% by volume.

12. The method according to claim 11, where the step of providing a plurality of composites comprises:
    (a) providing a plurality of at least partially hardened composites, the at least partially hardened composites having been at least partially hardened by the application of heat to a plurality of composite precursors.

13. The method according to claim 12, wherein the plurality of at least partially hardened composites has an initial intra-composite porosity; and the step of molding the plurality of abrasive composites to form an abrasive article comprises:
    (a) molding the plurality of at least partially hardened composites to form an abrasive article and to form hardened abrasive composites, the hardened abrasive composites having a final intra-composite porosity greater than zero volume percent of the hardened abrasive composites.

14. The method according to claim 11, wherein the step of molding the plurality of abrasive composites to form an abrasive article having a porosity between the abrasive composites of at least 20% by volume comprises:
    (a) molding the plurality of abrasive composites to form an abrasive article having a porosity between the abrasive composites of 25–75% by volume.

15. A method of refining a workpiece surface, comprising:
    (a) providing an abrasive article comprising:
        (i) a plurality of abrasive composites, the abrasive composites comprising:
            (A) a plurality of primary abrasive particles having an average particle dimension of no greater than about 10 micrometers; and
            (B) a ceramic first binder matrix binding the plurality of abrasive particles to form the abrasive composites;
        (ii) an inter-composite porosity of at least 20% by volume;
    (b) contacting a workpiece surface with the plurality of abrasive composites; and
    (c) moving the abrasive article and workpiece surface in relation to one another.

16. The method according to claim 15, wherein the step of moving the abrasive article and workpiece surface in relation to one another comprises:
    (a) moving the abrasive article and workpiece surface in relation to one another in the presence of a lubricant.

* * * * *

UNITED STATES PATENT AND TRADEMARK OFFICE
CERTIFICATE OF CORRECTION

PATENT NO. : 6,702,650 B2
DATED : March 9, 2004
INVENTOR(S) : Adefris, Negus B.

It is certified that error appears in the above-identified patent and that said Letters Patent is hereby corrected as shown below:

Column 10,
Line 45, delete the word "filly" and insert in place thereof -- fully --.

Column 14,
Line 62, delete the work "tree" and insert in place thereof -- three --.

Column 15,
Line 1, delete the word "tree" and insert in place thereof -- three --.

Signed and Sealed this

Fourth Day of January, 2005

JON W. DUDAS
*Director of the United States Patent and Trademark Office*